No. 660,494. Patented Oct. 23, 1900.
E. B. EVANS.
HALTER.
(Application filed Apr. 3, 1900.)
(No Model.)
Fig. I.
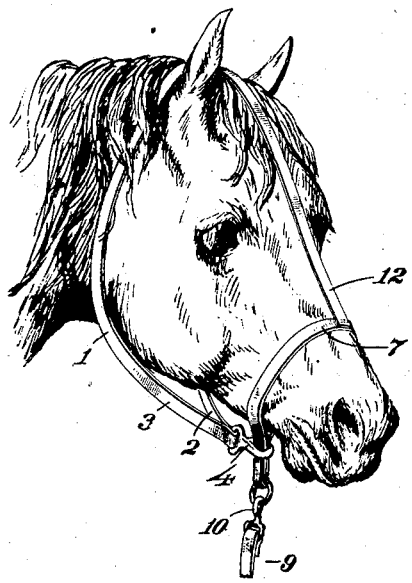
Fig. II.
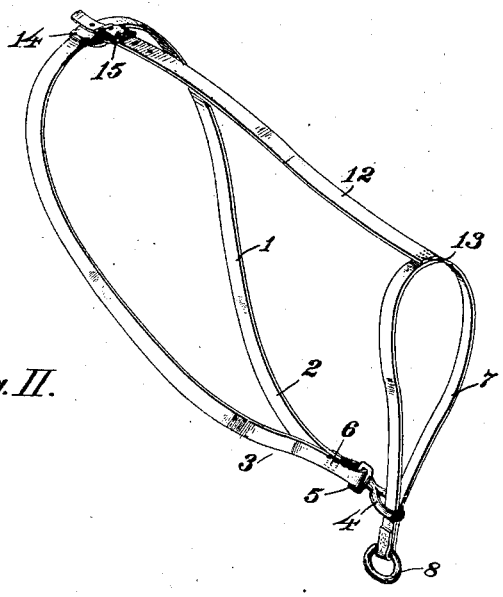
Witnesses
H. S. Austin
Karl Daniel
Inventor:
Enoch Baker Evans
By Joseph M. Atkins
Attorney
THE NORRIS PETERS CO., PHOTO-LITHO., WASHINGTON, D. C.

UNITED STATES PATENT OFFICE.

ENOCH BAKER EVANS, OF WASHINGTON, DISTRICT OF COLUMBIA.

HALTER.

SPECIFICATION forming part of Letters Patent No. 660,494, dated October 23, 1900.

Application filed April 3, 1900. Serial No. 11,372. (No model.)

*To all whom it may concern:*

Be it known that I, ENOCH BAKER EVANS, of Washington, District of Columbia, have invented certain new and useful Improvements in Halters, of which the following is a complete specification, reference being had to the accompanying drawings.

The object of my invention is to produce a strong, durable, and inexpensive halter which is easily adjusted so as to securely hold an animal and from which the animal cannot free itself.

In the accompanying drawings, Figure I is a perspective view of a horse's head harnessed with my halter. Fig. II is a perspective view of the halter detached.

Referring to the numerals on the drawings, 1 indicates the neck-loop of my halter, which may consist of a strap of leather or other flexible material made of a size to be passed over the head of an animal and to reach from its neck to a point underneath the lower end of its under jaw, where its converging ends 2 and 3 are united and provided with a slip-ring. A preferred form of slip-ring is the ordinary metallic runner 4, which is secured to the neck-loop, as in the bend 5 of an extended end of the strap 1, which is bent back and secured with the ends 2 and 3, as indicated at 6, as by stitches, rivets, or other suitable means. The runner 4 is designed to accommodate a nose-loop 7, whose ends are united and secured, as by stitching or other suitable means, to a ring 8, into which a hitching-strap may be fastened, as by a snap-hook 10. The nose-loop 7 and neck-loop 1 are preferably united, as by a strap 12, secured, as indicated at 13 and 14, to the tops of the loops 7 and 1, respectively. The strap 12 is preferably adjustable, as by means of the ordinary buckle-and-tongue connection, (indicated at 15.)

From the foregoing description it will appear that my halter consists solely of three straps—to wit, the neck-loop 1, nose-loop 7, and face-strap 12, the last-named strap serving to unite the other two and the neck and nose loops being united by a runner, the term "runner" being employed to designate any member which will secure the nose-loop to the neck-loop with freedom of movement between the two. The respective lengths of the neck-loop and nose-loop straps are so proportioned as to bring the runner underneath the lower end of the jaw of an animal to which the halter is fitted, so that when the head of the animal is held in the natural position all the straps hang loosely and that they only draw about the head when they are required to restrain the animal.

In practice the neck-loop 1 is slipped over the head of an animal and the nose-loop 7 is drawn through the runner 4 until it readily passes around its nose, in which position it is suspended at the required height by the strap 12. When properly adjusted, the converging ends 2 and 3 pass underneath the jaw of the animal and are held thereby securely in place upon its head, so that it cannot release itself.

The simplicity of construction of my halter, as above specified, facilitates the cleaning and dressing of the head of an animal by which the halter is worn and is for that reason especially adapted for use upon animals which are kept carefully groomed.

What I claim is—

1. A halter comprising an independent neck-loop adapted to reach from the top of the neck to a point underneath the lower end of the jaw of an animal, said neck-loop being open from its upper to its lower end, a runner fixed to the lower converging ends of the neck-loop, a nose-loop working loosely through the runner, and means for retaining the top of the neck-loop in place upon the neck, adjacent to the head of the animal.

2. A halter consisting of but four pieces, a neck-loop provided with a runner at its lower end and open from top to bottom, a nose-loop working loosely through the runner in close juxtaposition to the neck-loop, and a face-strap connecting the top of the neck-loop and the front of the nose-loop.

In testimony of all which I have hereunto subscribed my name.

ENOCH BAKER EVANS.

Witnesses:
KARL J. DANIEL,
HOWARD S. AUSTIN.